(12) United States Patent
Yuan

(10) Patent No.: US 10,763,931 B2
(45) Date of Patent: Sep. 1, 2020

(54) COMMUNICATION DEVICE AND A METHOD FOR HYBRID BEAMFORMING

(71) Applicant: Intel Corporation, Santa Clara, CA (US)

(72) Inventor: Fang Yuan, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/323,777

(22) PCT Filed: Sep. 27, 2016

(86) PCT No.: PCT/CN2016/100222
§ 371 (c)(1),
(2) Date: Feb. 7, 2019

(87) PCT Pub. No.: WO2018/058262
PCT Pub. Date: Apr. 5, 2018

(65) Prior Publication Data
US 2020/0195325 A1 Jun. 18, 2020

(51) Int. Cl.
*H04B 7/06* (2006.01)
*H04B 7/0456* (2017.01)

(52) U.S. Cl.
CPC ......... *H04B 7/0617* (2013.01); *H04B 7/0486* (2013.01); *H04B 7/0634* (2013.01)

(58) Field of Classification Search
CPC .. H04B 7/0695; H04B 7/0617; H04B 7/0486; H04B 7/0634
See application file for complete search history.

(56) References Cited

U.S. PATENT DOCUMENTS

| 7,710,925 B2 | 5/2010 | Poon |
| 9,362,994 B2 | 6/2016 | Seol et al. |
| 2005/0286404 A1 | 12/2005 | Poon |
| 2013/0258972 A1* | 10/2013 | Kim ............... H04B 7/0634 370/329 |
| 2013/0301454 A1 | 11/2013 | Seol et al. |

(Continued)

FOREIGN PATENT DOCUMENTS

| CN | 102355288 A | 2/2012 |
| CN | 104303477 A | 1/2015 |
| WO | 2015188385 A1 | 12/2015 |

OTHER PUBLICATIONS

International Search Report based on application No. PCT/CN2016/100222 dated Jun. 16, 2017 (11 pages).

(Continued)

*Primary Examiner* — Sung S Ahn
(74) *Attorney, Agent, or Firm* — Kowert, Hood, Munyon, Rankin & Goetzel, P.C.

(57) ABSTRACT

A method and a communication device adapted for designing a hybrid beamforming (HB) precoding used in a mobile communication system with an antenna array, the method including aggregating spatial channel vectors received by the antenna array; performing a linear factorization of the aggregation; truncating the linear factorization to generate truncated channels; and designing the HB precoding based on the truncated channels, wherein the HB precoding includes a linearly generated analog beamforming component and a linearly generated digital beamforming component.

25 Claims, 10 Drawing Sheets

(56) References Cited

U.S. PATENT DOCUMENTS

2016/0065288 A1* 3/2016 Yu .................. H04B 7/0617
375/267

OTHER PUBLICATIONS

Alkhateeb et al.,"Frequency Selective Hybrid Precoding for Limited Feedback Millimeter Wave Systems", 2016, 42 pages.
Ayach et al., "Spatially Sparse Precoding in Millimeter Wave MIMO Systems," IEEE Transactions on Wireless Communications, Mar. 2014, pp. 1499-1513, vol. 13, No. 3.
Alkhateeb et al., "Limited Feedback Hybrid Precoding for Multi-User Millimeter Wave Systems", IEEE Transactions on Wireless Communications vol. 14(11), Mar. 2015, pp. 6481-6494.

* cited by examiner

602 — Aggregate UE channels for subcarrier f=1,...,C

604 — Linerar MU-MIMO precoding for subcarrier f=1,...,C

606 — Aggregate subcarrier MU-MIMO precoders

608 — SVD to aggregated precoders

610 — Analog beamforming matrix calculation

702 — Digital beamforming vector generation for UE k=1,...,K on subcarrier f=1,...,C 704 — Digital beamforming vector scaling for UE k=1,...,K on subcarrier f=1,...,C

US 10,763,931 B2

COMMUNICATION DEVICE AND A METHOD FOR HYBRID BEAMFORMING

CROSS-REFERENCE TO RELATED APPLICATIONS

This application is a national stage entry according to 35 U.S.C. § 371 of PCT Application No. PCT/CN2016/100222 filed on Sep. 27, 2016, which is incorporated herein by reference in its entirety.

TECHNICAL FIELD

Various aspects of this disclosure relate generally to a method and a device for wireless communications.

BACKGROUND

Hybrid beamforming systems include elements of in both the analog and digital domains. Antenna ports with radio frequency (RF) chains provide the full capability of digital beamforming while arrays of antenna elements with phase shifters provide the capability of analog beamforming. Hybrid beamforming is expected to achieve the high performance of full digital massive multiple input multiple output (MIMO) while minimizing the high costs associated with the RF chains in digital beamforming.

Current solutions to hybrid precoding design for a hybrid beamforming system include a fixed analog beamforming that is set according to the down tilt of the antenna array or generating analog and digital beamforming by nonlinear iteration optimizations/exhaustive search. The former has the benefit of a low precoding complexity, but it cannot achieve high system performance. The latter can achieve high system performance, but it has an extremely high precoding complexity, especially for an orthogonal frequency-division multiple access (OFDMA) multi-user MIMO system. Due to multiple users and multiple subcarriers which need to be considered, these iteration optimization-based hybrid precoding techniques experience unacceptably high computational complexity. Moreover, convergence of the iterations cannot be guaranteed.

The subject matter disclosed herein provides a device and a method for hybrid beamforming precoding with high system performance while minimizing precoding complexity.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 6 shows a block diagram for analog beamforming generation in an aspect of this disclosure.

FIG. 7 shows a block diagram for digital beamforming generation in an aspect of this disclosure.

DESCRIPTION

Figure 1:
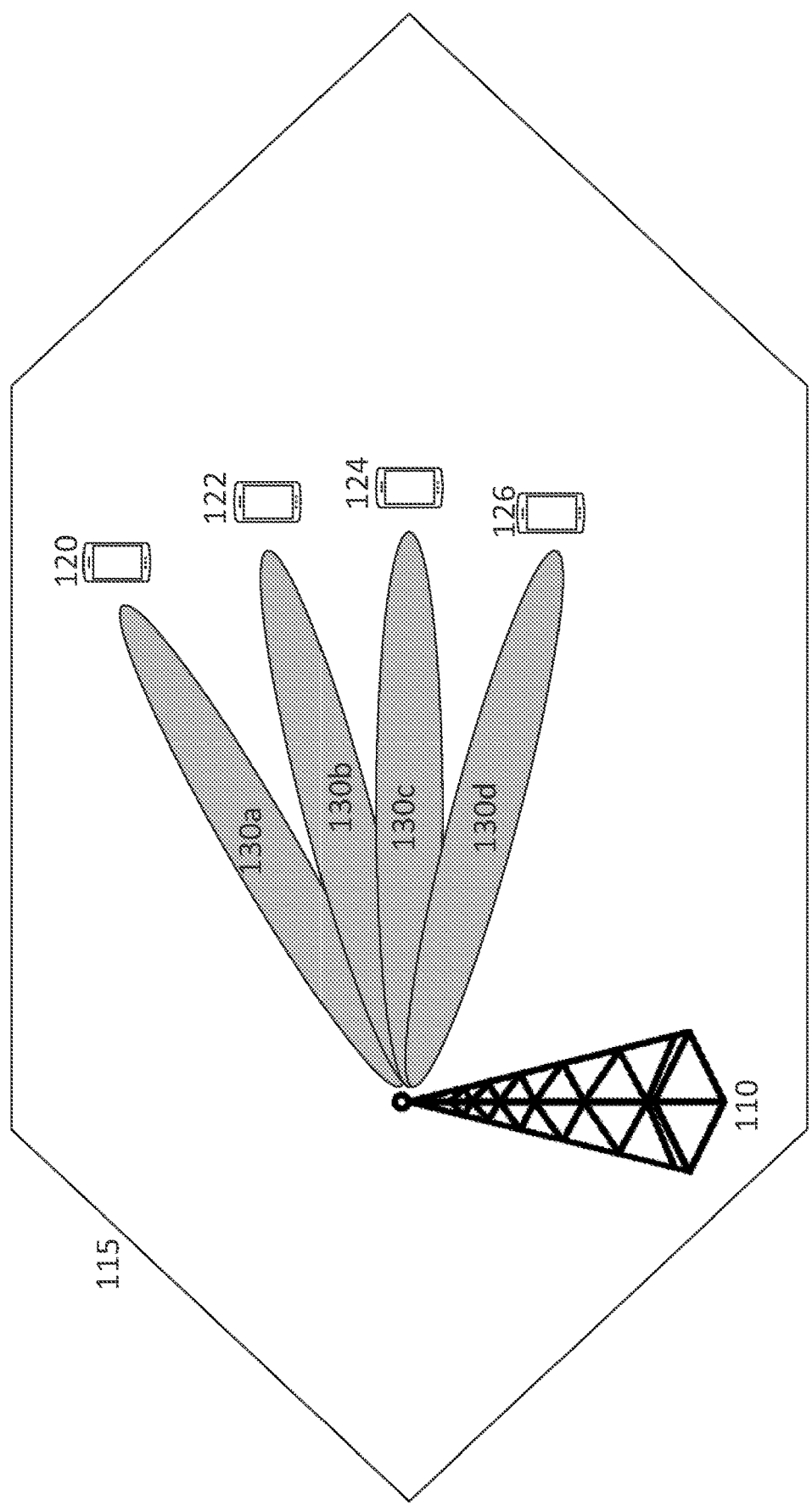
FIG. 1 shows a communication network in an aspect of this disclosure.

The following details description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

A "processing circuit" (or equivalently "processing circuitry" or "processer") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

As used herein, a "cell", in the context of telecommunications, may be understood as a sector served by a base station. Accordingly, a cell may be a set of geographically co-located antennas that correspond to a particular sector of a base station. A base station may thus serve one or more "cells" (or "sectors"), where each cell is characterized by a distinct communication channel. An "inter-cell handover" may be understood as a handover from a first "cell" to a second "cell", where the first "cell" is different from the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different, base station. "Intra-base station handovers" may be understood as a handover from a first "cell" to a second "cell", where the first "cell" is provided at the same base station as the second "cell". A "serving cell" may be understood as a "cell" that a mobile terminal is currently connected to according to the mobile communications protocols of the associated mobile communications network standard. Furthermore, the term "cell" may be utilized to refer to any of a macrocell, microcell, picocell, or femtocell, etc.

The term "base station", used in reference to an access point of a mobile communications network, may be understood as a macro-base station, micro-base station, Node B, evolved Node B (eNodeB, eNB), Home eNodeB, Remote Radio Head (RRH), or relay point, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup tables and other array indexing or searching operations.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

The subject matter disclosed herein provides a device and method to design hybrid precoding with a linear algorithm, and in doing so, provide high system performance with a linear precoding complexity.

In a hybrid beamforming system, the number of antenna ports (i.e. the RF chains) is less than the number of antenna elements. This factor poses an additional constraint on hybrid precoding. Moreover, the hybrid precoding has to consider must consider multi-user OFDMA transmission, whereas analog beamforming is wideband for multiple users.

For the hybrid beamforming design of this disclosure, the user equipment (UE) spatial channel vectors on all subcarriers are aggregated and subsequently linearly decomposed by singular value decomposition (SVD) into wideband sub-spatial channel vectors. The channel truncation is performed by selecting the best, i.e. those that exhibit the highest values, wideband sub-spatial channel vectors for each UE. The truncated channels are used to generate a linear analog beamforming and digital beamforming. In this manner, the constraint of the given number of antenna ports and antenna elements can be satisfied, and the analog beamforming is wideband for multiple users.

FIG. 1 shows a communication network 100 in an aspect of this disclosure. It is appreciated that communication network 100 is exemplary in nature and may thus be simplified for purposes of this explanation.

Communication Network 100 may be configured in accordance with the network architecture of any one of, or any combination of, 5G, LTE (Long Term Evolution), WLAN (wireless local area network), WiFi, UMTS (Universal Mobile Telecommunications System), GSM (Global System for Mobile Communications), Bluetooth. CDMA (Code Division Multiple Access), Wideband CDMA (W-CDMA), etc.

Base station 110 may be associated with a radio access section of communication network 100, i.e. the Radio Access Network (RAN) of communication network 100. Base station 110 may thus act as an interface between the RAN of communication network 100 and an underlying core network of communication network 100 and may allow any proximate UEs, such as, for example, UEs 120-126 to exchange data with the core network of communication network 100.

Communication network 100 may by an LTE network, in which case, base station 110 may be an eNB. eNB 110 may have a corresponding coverage region 115. Coverage region 115 may comprise of a single cell (pictured) or a cluster of cells (not pictured), i.e. coverage region 115 may be sectorized. eNB 110 is responsible for providing coverage region 115 with access to the communication network. eNB 110 may comprise both antenna ports and antenna elements in order to implement a hybrid beamforming scheme. Communication network 100 may also comprise UEs 120-126, which are within the coverage region provided by base station 110.

eNB 110 may be configured to implement a hybrid beamforming scheme 130a-130d in order to receive or transmit communications with each of UEs 120-126. Beamforming is a technique used in wireless communications for directional signal transmission and/or reception. it combines elements in a phased array so that the signals constructively interfere at certain angles while other angles experience destructive interference. In this manner, a beamforming scheme can concentrate a signal to a target location, i.e. a particular UE location. In this disclosure, the base stations (i.e. the eNBs) or other communication devices (e.g. UEs, tablets, computers, etc.) implement a hybrid beamforming scheme, i.e. the eNB/devices beamform with both digital elements (the antenna ports, or the RF chains) and with analog elements (the antenna elements, which comprise phase shifters), using a linear algorithm in the preceding.

Current hybrid beamforming methods present drawbacks that this disclosure is able to avoid. For example, in one current implementation, the analog beamforming is fixed and set according to a down-tilt in the antenna array. While the precoding complexity of this implementation may be low, the overall system performance is low as well. In another example, the analog beamforming is not fixed, but both the analog and digital beamforming are generated by nonlinear algorithms through iteration optimizations or exhaustive searches. While this format provides for high system performance, it also presents the problem of very high precoding complexity, especially when applied to modern communication systems. The disclosure herein is able to achieve high system performance with a low precoding complexity.

Figure 2:
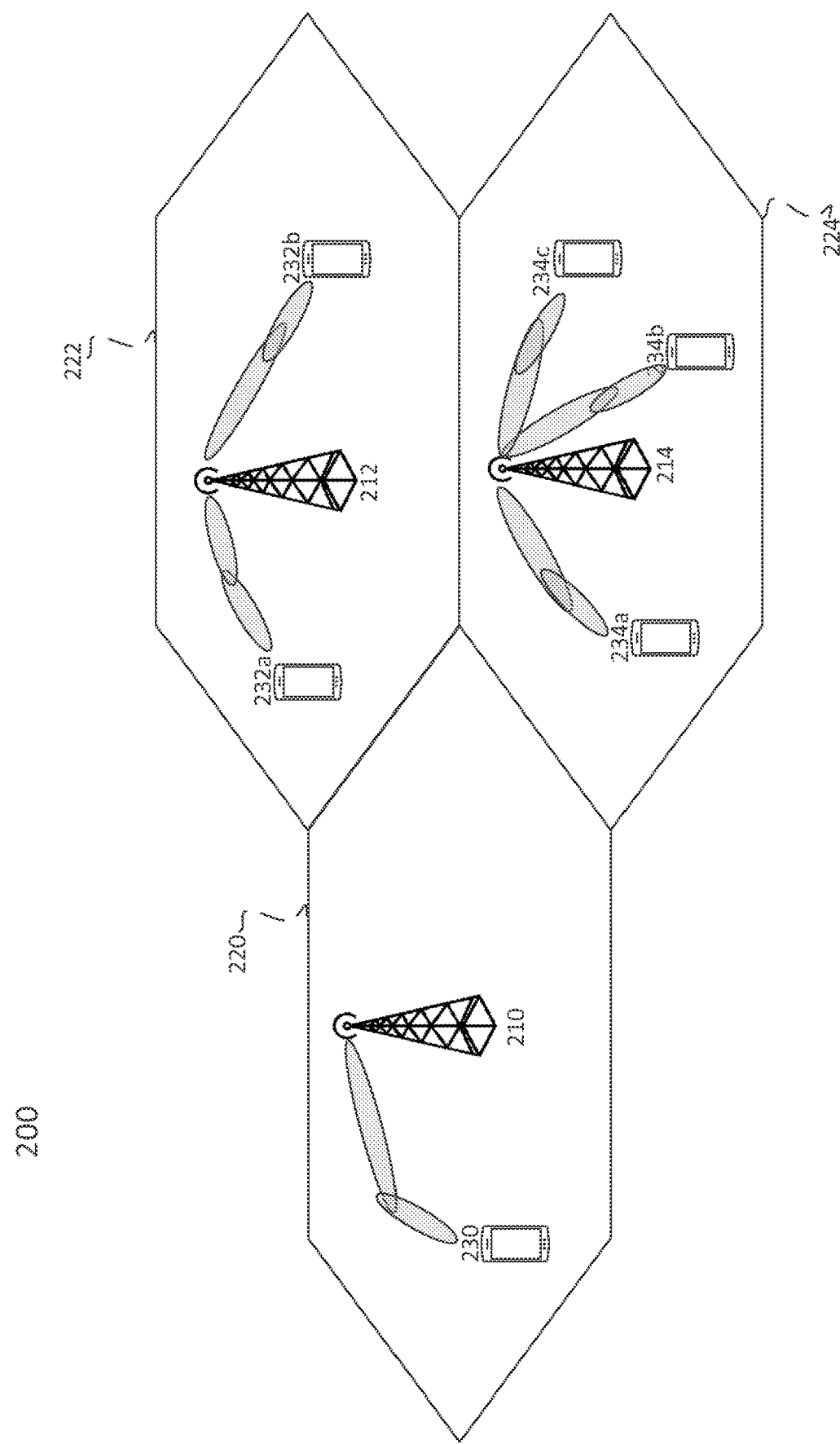
FIG. 2 shows a communication network in an aspect of this disclosure.

FIG. 2 shows a communication network 200 with base stations, 210-214, corresponding cells, 220-224, which serve UEs 230-234c. It is appreciated that communication network 200 is exemplary in nature and may thus be simplified for purposes of this explanation.

In communication network 200, both base stations 210-214 and UEs 230-234c are capable of hybrid beamforming, i.e. they both have at least one RF chain and multi-antenna arrays. In this manner, all the communications devices (i.e. the base stations and the UEs) are configured to implement the methods disclosed herein.

Figure 3:
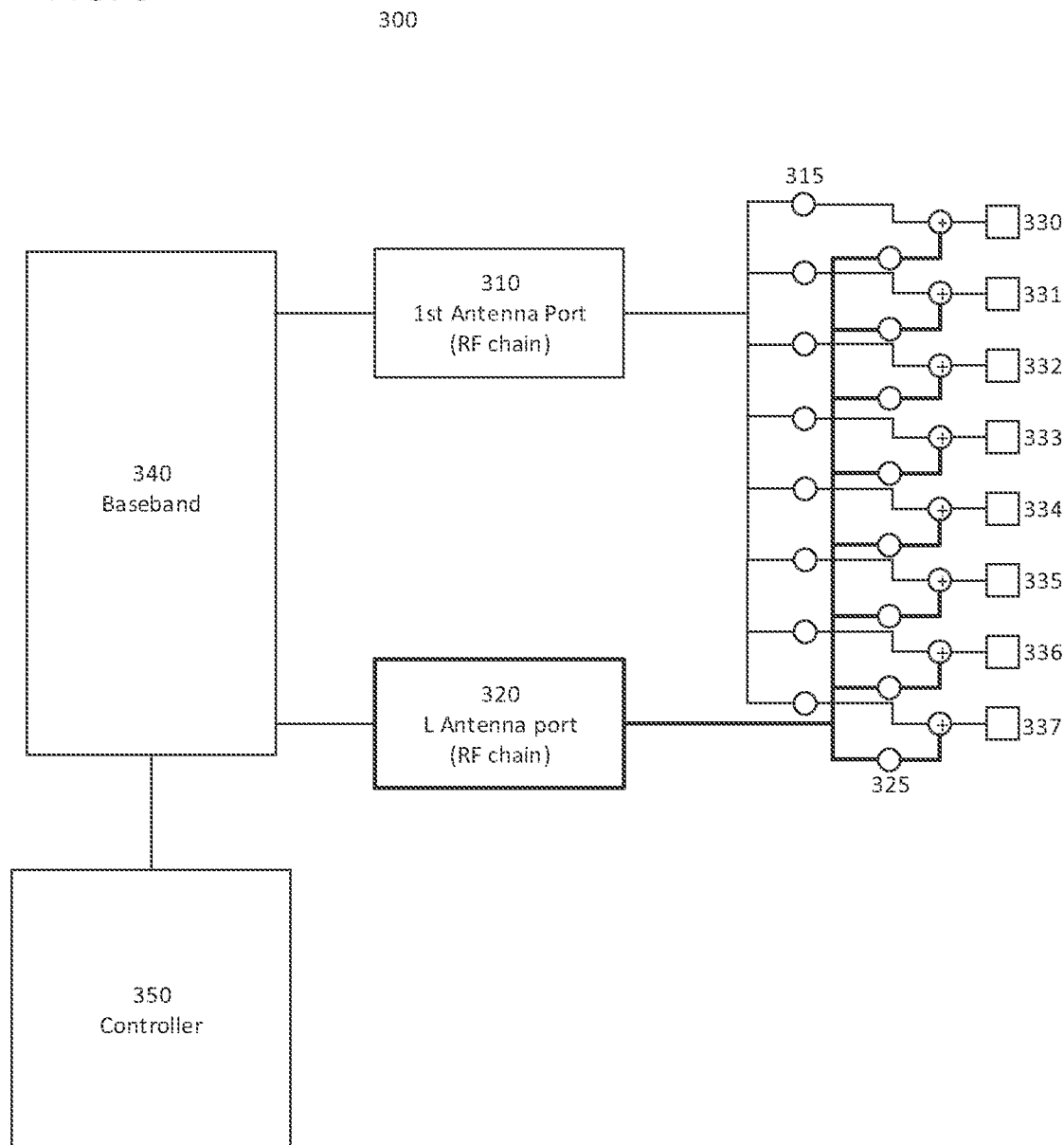
FIG. 3 shows an internal arrangement for a device in an aspect of this disclosure.

FIG. 3 shows an internal arrangement for a system model 300 for a communication device which is configured to implement a hybrid beamforming scheme to communicate with other devices in an aspect of this disclosure. It is appreciated that system model 300 is exemplary in nature and may thus be simplified for purposes of this explanation.

The digital domain of the base station consists of a plurality of antenna ports, 310-312. In this example, two antenna ports are shown (i.e. L=2), but it appreciated more systems with more antenna ports are included in this disclosure, i.e. L>2. Each antenna port consists of an RF chain, which may comprise RF devices such as transmitters, receivers, cables, amplifiers, attenuators, measurement instruments, loads, Digital to Analog Converters (DACs), Analog to Digital Converters (ADCs), etc. The antenna ports are connected to an array of N antenna elements, 330-337, which operate in the analog domain. In antenna system model 300, there are eight antenna elements shown, i.e. N=8, but it is appreciated that other quantities of antenna elements may be implemented in this disclosure. Phase shifters (a first set in the column under 315 and a second set in the column above 325) control the phase of the signal transmitted by each antenna element 330-337 in analog beamforming by manipulating the analog beamforming weight. By applying a phase shift to the signals transmitted by the antenna elements 330-337, the direction of constructive interference may be manipulated as required. The amplitudes and phases of the signals may be adjusted by applying suitable antenna weights.

A baseband unit (i.e. baseband controller) 340 is connected to the radio frequency unit (encompassing antenna ports 310-320 and antenna elements 330-337) of eNB 300 and may perform the baseband processing of mobile communication signals. Baseband unit 340 may further provide or receive digital mobile communication signals to or from at least one antenna port or antenna element. Elements 310-337 may be responsible for radio frequency processing of mobile communication signals and may include digital (e.g. the antenna ports 310-320) as well as analog circuitry (e.g. the antenna elements 330-337) in order to receive and perform initial processing on wireless radio frequency signals. The baseband unit 340 may exchange digital mobile communication data with one or more antenna ports or antenna elements over an optical fiber or similar high-speed connection, such as using a Common Public Radio Interface (CPRI) standard over an optical fiber data link.

It is understood that the components of base station 300 and all internal components thereof (e.g. the baseband hardware, radio frequency hardware, memory components, compression components, etc.) may be structurally implemented as hardware, software executed on hardware or a mixture thereof. Specifically, baseband unit 340 and radio frequency units 310-337 may include one or more digital processing circuits, such as logic circuits, processors, microprocessors, Central Processing Units (CPUs), Graphics Processing Units (GPUs) (including General-Purpose Computing on GPU (GPGPU)), Digital Signal Processors (DSPs), Field Programmable Gate Arrays (FPGAs), integrated circuits, Application Specific Integrated Circuits (ASICs), or any combination thereof. It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of base station 300 may be detailed herein substantially in terms of functional operation in recognition that a person of skill in the art may readily appreciate the various possible structural realizations of each component that will provide the desired functionality.

While the description may focus on the downlink or uplink path, it is understood that base station 300 may additionally be capable of in either direction.

Base station 300 may receive wireless uplink signals using antenna array 330-337. An analog combiner may then combine the resulting uplink data signals, such as by combining the uplink data signals from sets of two or more antennas of antenna array 330-337 in the analog domain. Analog combiner may thus yield analog data streams which indicate the number of analog data streams produced by analog combiner, which may be equal to or less than the actual number of physical receive antennas in antenna array 330-337.

Base station 300 may process the analog data streams received from analog combiner using processing circuitry. It may perform automatic gain control (AGC) and analog-to-digital conversion (ADC) on the analog data streams received from analog combiner and subsequently perform Fast Fourier Transform (FFT) processing in order to generate frequency domain symbols in the antenna ports 310-320.

Base station 300 may therefore further include channel estimation (CE) and compression hardware, which may be composed of digital processing circuitry in the antenna ports 310-320 and may thus require extra calculation and processing hardware, which may be utilized in order to perform channel estimation and calculate compression filters.

Baseband unit 340 may receive the data and perform equalization and coordinated processing. Baseband unit 340 may include digital processing circuitry and memory components, among other components.

The baseband unit 340 may be configured to implement any of the processes disclosed herein, including, but not limited to, channel truncation, analog beamforming generation, and/or digital beamforming generation.

Controller 350 may be connected to the baseband unit 340 and may be configured, among other things, to control higher level processing.

As shown in FIG. 3, the hybrid antenna system model 300 has a full connection mode between its N antenna elements 330-337 and L antenna ports 310-320. Without loss of generality, the design disclosed herein is explained by assuming that each UE has a single antenna, but the disclosure herein may easily be extended for multi-antenna UEs.

The hybrid precoding for k number UEs on a subcarrier f is given as ($1 \leq k \leq K$ and $1 \leq f \leq C$):

$$u_{f,k} = U_{AB} u_{DB,f,k} \quad (1)$$

Where $U_{AB}$ is the analog beamforming matrix of size N×L, $u_{DB,f,k}$ is the digital beamforming vector of L×1, and $K \leq L \leq N$. The analog beamforming matrix is wideband and implemented by phase shifters. The spatial channel vector between UE k and eNB on subcarrier f is denoted as $h_{f,k}$ which is of size N×1.

Figure 4:
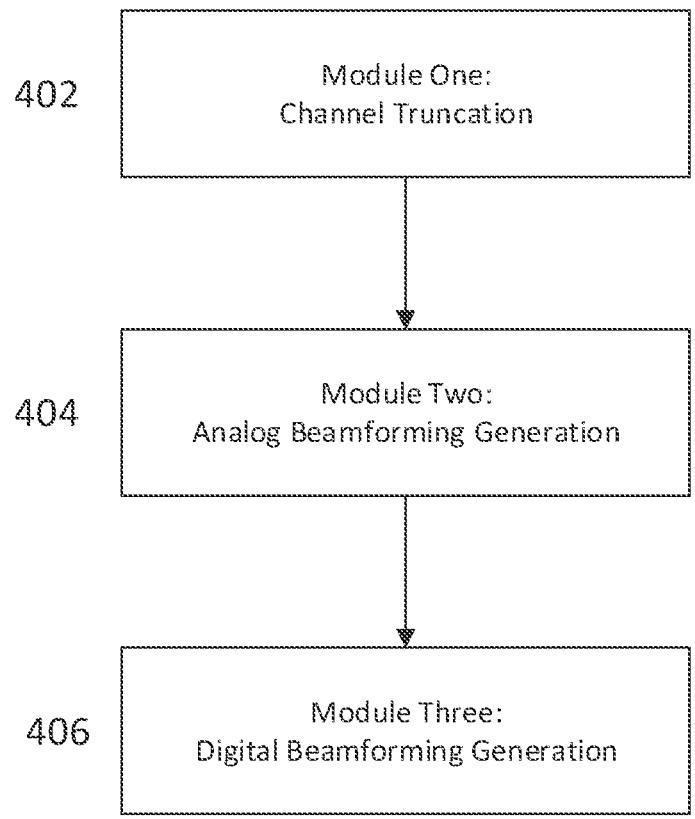
FIG. 4 shows a block diagram showing a hybrid precoding in an aspect of this disclosure.

FIG. 4 is a block diagram 400 showing a hybrid precoding in an aspect of this disclosure. It is appreciated that diagram 400 is exemplary in nature any may thus be simplified for purposes of this explanation.

The hybrid precoding design disclosed herein comprises three main modules: channel truncation 402, analog beamforming generation 404, and digital beamforming generation 406.

In the channel truncation 402, the UE spatial channel vectors ($h_{f,k}$) on each subcarrier f are aggregated across all subcarriers C, and then linearly decomposed by SVD into wideband sub-spatial channel vectors. Then, channel truncation is performed by selecting only the best of these wideband sup-spatial vectors to each UE.

In the analog beamforming generation 404, the truncated channels from 402 are used to generate the linear analog beamforming that is wideband for multiple users. In doing so, the constraint given by the number of antenna ports and antenna elements can be satisfied. Similarly, the digital beamforming generation 406 also uses the truncated channels determined in 402 to generate the digital beamforming.

Figure 5:
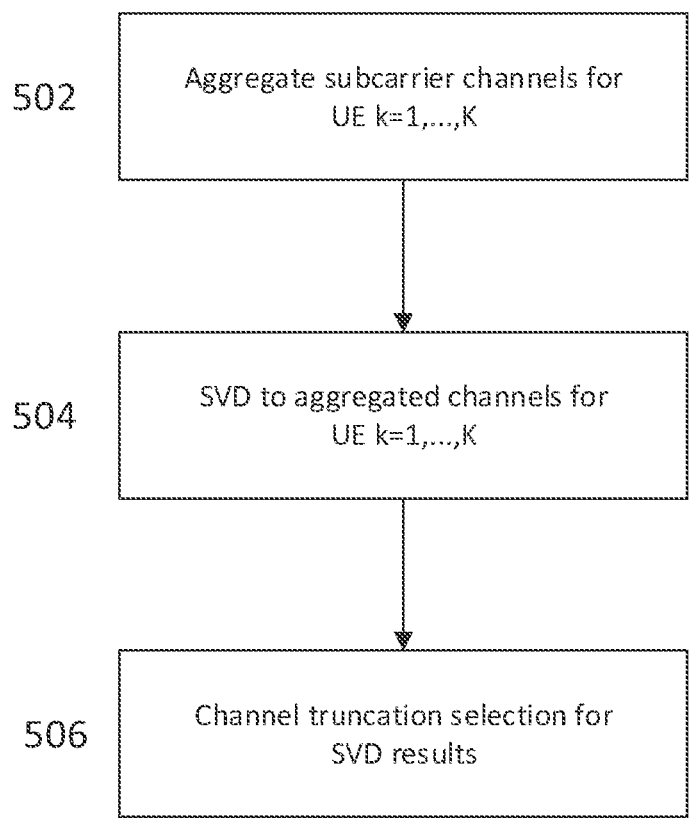
FIG. 5 shows a block diagram for a channel truncation in an aspect of this disclosure.

Each of modules of the precoding design are explained in more detail in FIG. 5-7.

FIG. 5 shows a block diagram 500 showing the details of channel truncation (i.e., 402 in FIG. 4) in an aspect of this disclosure. It is appreciated that diagram 500 is exemplary in nature and may thus be simplified for purposes of this explanation.

In 502, the spatial channel vectors of UE k are aggregated over all the scheduled subcarriers:

$$H_k = [h_{1,k}, \ldots, h_{C,k}] \quad (2)$$

where $h_{1,k}$ is the first spatial channel vector for subcarrier 1 for UE k and $h_{C,K}$ is the final spatial channel vector for subcarrier C for UE k. $H_k$ is a matrix of size N×C.

After the spatial channel vectors are aggregated, the singular value decomposition (SVD) is performed on $H_k$ 504

$$H_k = \sum_{p_k \in \Phi_k} \lambda_{p_k} \mu_{p_k} v_{p_k}^H \tag{3}$$

where $p_k$ is the index for the p-th largest singular value; $\Phi_k$ is the index set of eigenvalues in $H_k$; $r_k=|\Phi_k|$ is the column rank of $H_k$; $\lambda_{p_k}$ is the singular value in a descending order, $\mu_{p_k}$ is the left singular vector, and $v_{p_k}$ is the right singular vector.

From the SVD, the left singular vectors, $\mu_{p_k}$, may be viewed as wideband sub-spatial channel vectors since the spatial directions are the same across all the subcarriers. The right singular vectors, $v_{p_k}^H$, which have elements varying over subcarriers, correspond to the frequency responses for wideband sub-spatial channel vectors.

The aggregated spatial channel matrix, $H_k$, is truncated 506 by keeping only $\hat{r}_k$ singular values as:

$$\hat{H}_k = \sum_{p_k \in \hat{\Phi}_k} \lambda_{p_k} \mu_{p_k} v_{p_k}^H = [\hat{h}_{1,k}, \ldots, \hat{h}_{C,k}] \tag{4}$$

The rank $\hat{r}_k=|\hat{\Phi}_k|$ of the truncated channel $\hat{H}_k$ can be different from UE to UE, but the sum constraint must be met, i.e. $\Sigma_{k=1}^{K}\hat{r}_k=L$, where L is the number of antenna ports of the hybrid beamforming antenna system, a basic constraint to the channel truncation of this disclosure.

The allocation of $\hat{r}_k$ and the setting of $\hat{\Phi}_k$ to each UE is a design option which may be varied depending on the usage case. For example, in one usage case, to maximize the rate of UE k, the first $\hat{r}_k$-strongest eigenvalues are selected in the channel truncation to UE k. For example, the first X strongest (i.e. highest) eigenvalues may be selected for channel truncation, where X is an integer greater than zero but less than the number of total eigenvalues.

If the truncated channel has the rank sum constrained as $$\sum_{k=1}^{K} \hat{r}_k = L,$$

the aggregated full linear digital precoder U=[$U_1, \ldots, U_C$] has a column rank no larger than L. Any linear digital MU-MIMO precoder on subcarrier f, e.g. by zero-forcing (ZF) or minimum mean squared error (MMSE), is a linear combination of all UE's spatial channel vectors on subcarrier f. Thus, the rank of $U_f$ is identical to the rank of truncated channel $H_f$. Because $\hat{H}_f$ for different subcarriers contains the same selected wideband sub-spatial channel vectors, all $\hat{H}_f$ for f=1, ..., C span the same column space as [$\hat{H}_1, \ldots, \hat{H}_K$], which means the full digital precoder U=[$U_1, \ldots, U_C$] has a column rank identical to [$\hat{H}_1, \ldots, \hat{H}_K$], i.e.

$$\sum_{k=1}^{K} \hat{r}_k = L.$$

This factor indicates that the channel truncation shown in FIG. 5 guarantees that the analog and digital beamforming generation generates a hybrid precoding which satisfies the constraint by the hybrid antenna array.

The strategies of channel truncation, i.e. the allocation of $\hat{r}_k$ and the setting of $\hat{\Phi}_k$ to each UE can be chose based on usage cases. The strategies of channel truncation, i.e. choosing the wideband sub-spatial channel vectors and the corresponding strengths can be varied to achieve the defined optimality in different usage cases. Two examples illustrate this point below.

The first example is a gain-optimal based truncation. The channel truncation only keeps the wideband sub-spatial channel vectors with the first L-largest eigenvalues.

The second example is a capacity-optimal based truncation, which denotes the sum rate of MU-MIMO on subcarrier f under a given allocation profile $\hat{r}_k$ as $R_f(\hat{\Phi}_1, \ldots, \hat{\Phi}_K)$, then the strategy is to solve the optimization:

$$\max_{\sum_{k=1}^{K} |\hat{\Phi}_k|=L} \sum_{f=1}^{C} R_f(\hat{\Phi}_1, \ldots, \hat{\Phi}_K) \tag{5}$$

where greedy optimization can be applied to achieve a linear complexity in order to make the truncation selection.

FIG. 6 shows a block diagram 600 showing the details for analog beamforming generation (i.e. 404 in FIG. 4) in an aspect of this disclosure. It is appreciated that diagram 600 is exemplary in nature and may thus be simplified for purposes of this disclosure.

In 602, the truncated spatial channel vectors of all K UEs on subcarrier f are aggregated as:

$$\hat{H}_f=[\hat{h}_{f,1}, \ldots, \hat{h}_{f,K}] \tag{6}$$

which is of size N×K.

The linear precoding vector $u_{f,k}$ of UE k on subcarrier f is linearly calculated 604 from the truncated channels, $\hat{h}_{f,k}$. Specifically, if zero-forcing (ZF) and minimum mean squared error (MMSE) beamforming are considered, the multiple user-MIMO (MU-MIMO) precoder on subcarrier f can be found, respectively, as:

$$U_f=[u_{f,1}, \ldots, u_{f,K}]=(\hat{H}_f^H\hat{H}_f)^{-1}\hat{H}_f^H \tag{7}$$

$$U_f=[u_{f,1}, \ldots, u_{f,K}]=(\hat{H}_f^H\hat{H}_f+R_n)^{-1}\hat{H}_f^H \tag{8}$$

where $R_n$ is the receiver noise matrix.

The overall MU-MIMO precoder is aggregated over all of the subcarriers 606 as $$U=[U_1, \ldots, U_C] \tag{9}$$

which is of size N×KC.

Then, taking a short SVD of rank L to U 608:

$$U=U_A DV \tag{10}$$

where $U_A$ us of size N×L and V=[$V_1, \ldots, V_C$].

The analog beamforming matrix is then constructed 610 as $$U_{AB}=2U_A \text{diag}[d_1^{-1}, \ldots, d_L^{-1}] \tag{11}$$

where $$d_l=\max|U_A(i,l)|; \ 1 \le i \le N \tag{12}$$

is the maximum absolute value of the elements in the lth column of $U_A$ and $1 \le l \le L$.

In order to transform the analog beamforming matrix ($U_{AB}$) to meet the requirement of having elements with only phases, $U_{AB}$ is transformed into a product matrix $\hat{U}_{AB}$ of size $N \times 2L$ and a matrix $D_{AB}$ of size $2L \times L$. The elements of $\hat{U}_{AB}$ are given by:

$$\hat{U}_{AB}(n, 2j-1) = e^{i\left(phase\left(U_{AB}(n,j)\right) - \cos^{-1}\left(\frac{abs(U_{AB}(n,j))}{2d_j}\right)\right)} \quad (13)$$

$$\hat{U}_{AB}(n, 2j) = e^{i\left(phase\left(U_{AB}(n,j)\right) + \cos^{-1}\left(\frac{abs(U_{AB}(n,j))}{2d_j}\right)\right)} \quad (14)$$

where $n=1, \ldots, N$ and $j=1, \ldots, L$.

The matrix of $D_{AB}$ is given by $$D_{AB} = \begin{bmatrix} d_1 & \ldots & 0 \\ d_1 & \ldots & 0 \\ 0 & \ldots & 0 \\ \ldots & \ldots & \ldots \\ 0 & \ldots & d_L \\ 0 & \ldots & d_L \end{bmatrix} \quad (15)$$

By setting $U_{AB} = \hat{U}_{AB} D_{AB}$, the matrix $U_{AB}$ can be implemented by phase-shifters in the hybrid antenna array, and $D_{AB}$, which has L positive scalars, can be implemented by L analog to digital converters (ADCs) in the RF chains of the antenna ports.

Any digital precoder $U_{AB}$ of size $N \times L$ can be implemented by using $N \times 2L$ phase shifters and L ADCs, i.e. $U_{AB} = \hat{U}_{AB} D_{AB}$, where $\hat{U}_{AB}$ and $D_{AB}$ are determined as specified in FIG. 6. This holds true in any case. Therefore, it ensures the designed analog beamforming matrix $U_{AB}$ from FIG. 6 can be implemented by $N \times 2L$ phase-shifters and equivalently viewed as analog beamforming.

FIG. 7 shows a block diagram 700 showing the details for digital beamforming generation (i.e. 406 in FIG. 4) in an aspect of this disclosure. It is appreciated that diagram 700 is exemplary in nature and may thus be simplified for purposes of this disclosure.

After the analog beamforming generation, the digital beamforming vector for UE k on subcarrier f is calculated 702 as $$u_{DB,f,k} = (U_{AB}^H U_{AB})^{-1} U_{AB}^H u_{f,k} \quad (16)$$

which is of size $L \times 1$. Then, the digital beamforming vector can be scaled 704 as normalized by $$u_{DB,f,k} = \eta_{f,k} u_{DB,f,k} \quad (17)$$

where $\eta_{f,k}$ is a scalar.

If the MU-MIMO precoder $U=[U_1, \ldots, U_C]$ of size $N \times KC$ aggregated from all of the subcarriers has a column rank no larger than L. U can be implemented by using a hybrid antenna array structure, i.e., the overall MU-MIMO precoder on subcarrier f is $U_f = U_{AB}[u_{DB,f,1}, \ldots, u_{DB,f,K}]$. This is supported by the SVD of $U=U_A DV$, where $U_A$ is of size $N \times L$ due to the rank constraint. The analog beamforming matrix $U_{AB}$ is constructed as shown in FIG. 6, and the digital beamforming matrix $u_{DB,f,k}$ is constructed as shown in FIG. 7.

As shown in FIG. 6, the part of precoding $U_{AB}$ can be implemented by $N \times 2L$ phase-shifters and L ADCs in the antenna ports. Then, the remaining part $[u_{DB,f,1}, \ldots, u_{DB,f,K}]$, can be implemented as digital MU-MIMO precoders on subcarrier f by L antenna ports.

If the full digital precoder has a column rank no larger than L, FIGS. 6 and 7 provide a hybrid precoding design that can be applied in the hybrid beamforming system.

Figure 8:
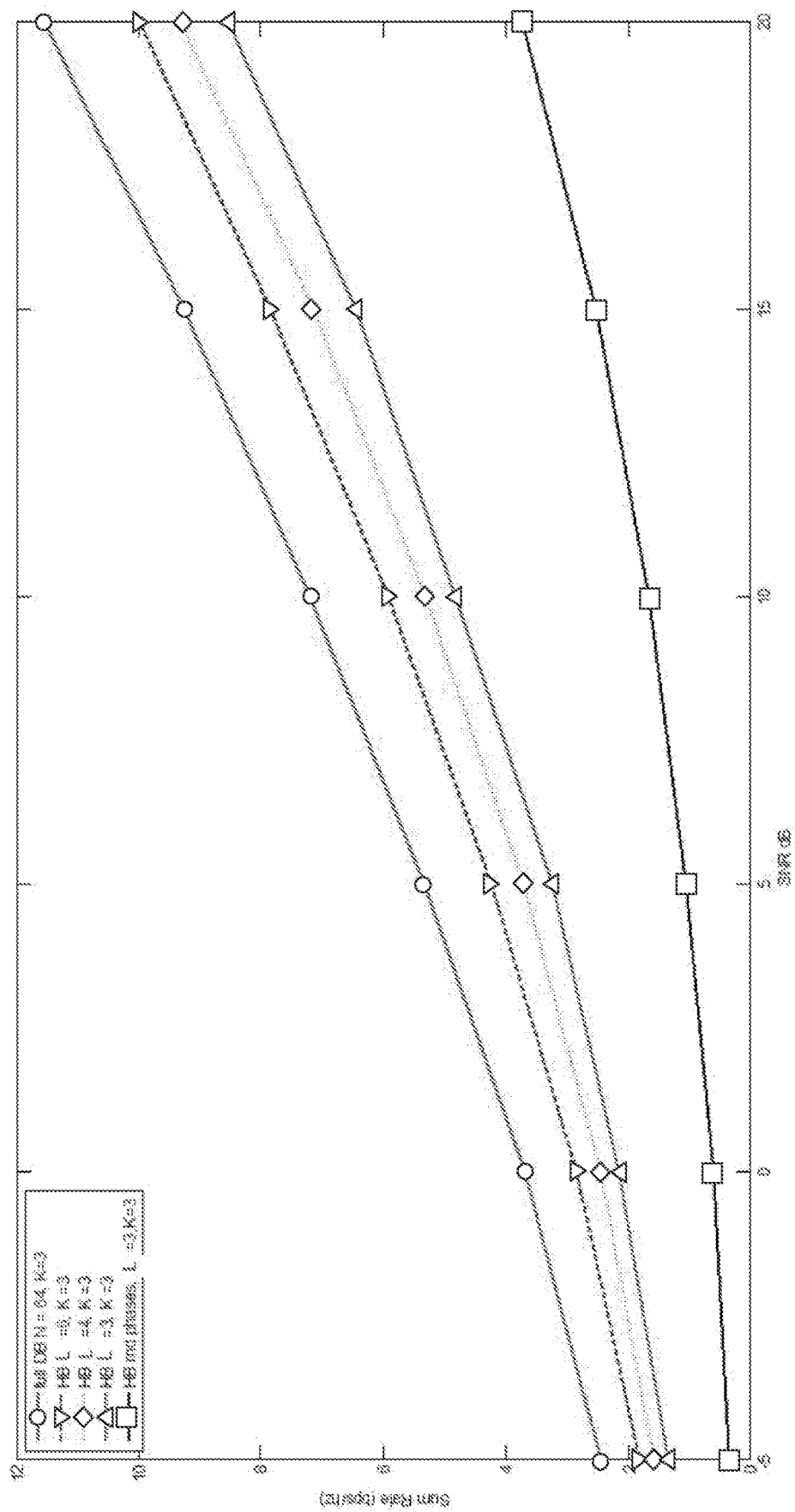
FIG. 8 shows a graph with simulation results for a designed hybrid precoding in an aspect this disclosure.

FIG. 8 shows a graph 800 depicting simulation results for a designed hybrid precoding in this disclosure.

Simulation results are reported for a designed hybrid precoding with 64 antenna elements (i.e. N=64) and 3 UEs (i.e. K=3). The channel truncation in the design of this aspect of the disclosure is based on a implementing a greedy algorithm to optimize the capacity. The ZF precoding algorithm is applied to both a full digital beamforming (DB) system and the hybrid beamforming (HB) systems. The physical channels are generated according to 3GPP TR 36.873.

The line marked with the circles in graph 800 shows the simulation results of the full DB system. While the performance of the full HB system is the highest, the complexity of the precoding design is also extremely high.

However, by implementing the design disclosed herein with only 6 antenna ports (i.e. L=6), as shown by the line marked with the inverted triangles, the HB system of this disclosure shows only a 2 bps/Hz capacity loss to the full DB system with a significant reduction in precoding complexity. Even by using four antenna ports (L=4, line marked with diamonds) or even three antenna ports (L=3, line marked with triangles), there is less than a 4 bps/Hz capacity loss at 20 dB channel signal to noise ratio (SNR).

In contrast, the HB system using fixed but randomly-chosen phases in analog beamforming, while providing the benefit of low computational complexity when compared to the full DB system, shows a sum rate of less than 4 bps/Hz, or markedly less than half of the rate by using the designed hybrid precoding design of this disclosure.

Figure 9:
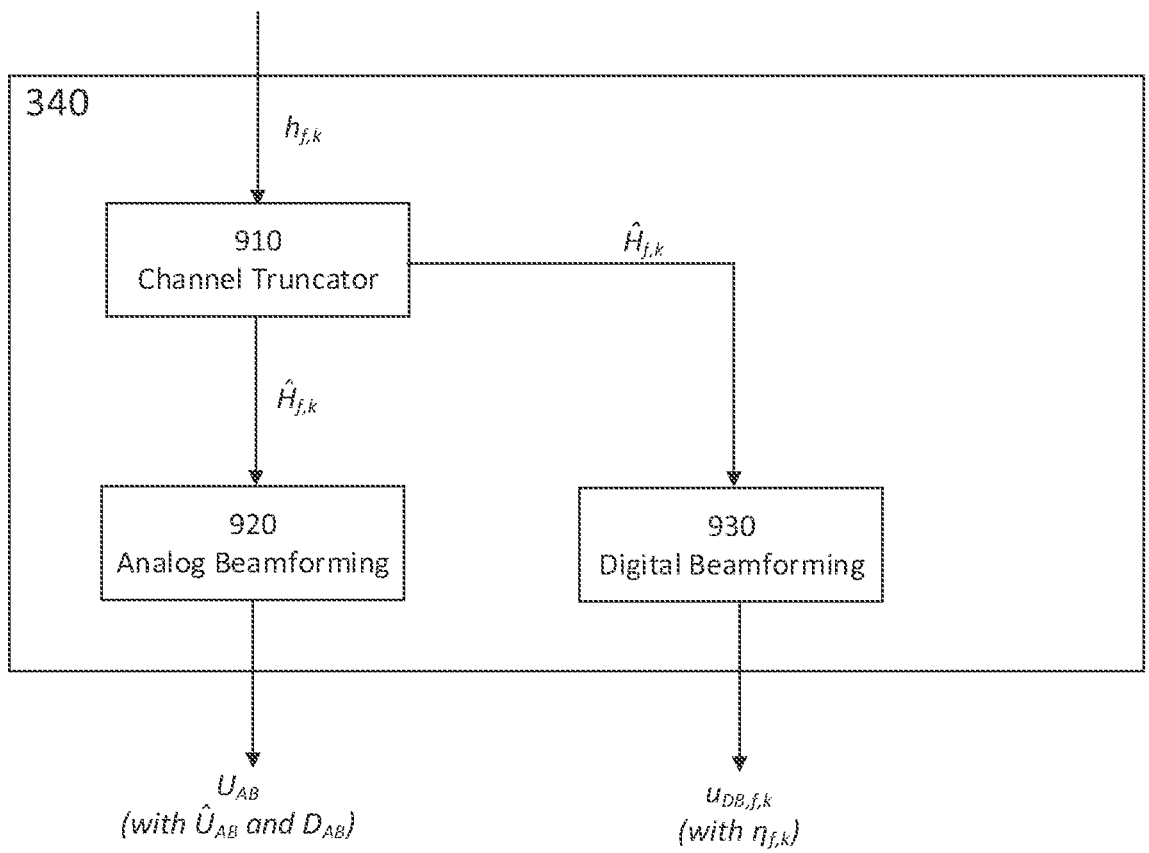
FIG. 9 shows a circuit diagram for a communication device in an aspect of this disclosure.

FIG. 9 shows a circuit diagram 900 for the baseband unit 340 of a communication device depicting the components related to hybrid beamforming precoding in an aspect of this disclosure. It is appreciated that circuit diagram 900 is exemplary in nature and may thus be simplified for purposes of this explanation.

The baseband unit 340 (or similarly, a physical layer processing circuit of the communication device) may include channel truncation circuitry 910, which may, for example, include aggregation circuitry, circuitry configured to determine the SVD, and truncation circuitry configured to select highest value from the SVD. The channel truncation circuitry 910 may be configured to implement the method described in FIG. 5.

The baseband unit 340 may further include analog beamforming circuitry 920, which may include aggregation circuitry, linear precoding circuitry, SVD calculation circuitry, and analog beamforming calculation circuitry. Analog beamforming circuitry 920 may be configured to implement the method described in FIG. 6.

The baseband unit 340 may further include digital beamforming circuitry 930, which may include digital beamforming vector generation circuitry and digital beamforming vector scaling circuitry. Digital beamforming circuitry 930 may be configured to implement the method described in FIG. 7.

In an alternate embodiment, analog beamforming circuitry 920 and digital beamforming circuitry 930 may be merged into a single circuitry component configured to produce both analog and digital beamforming components for the hybrid beamforming precoding.

Figure 10:
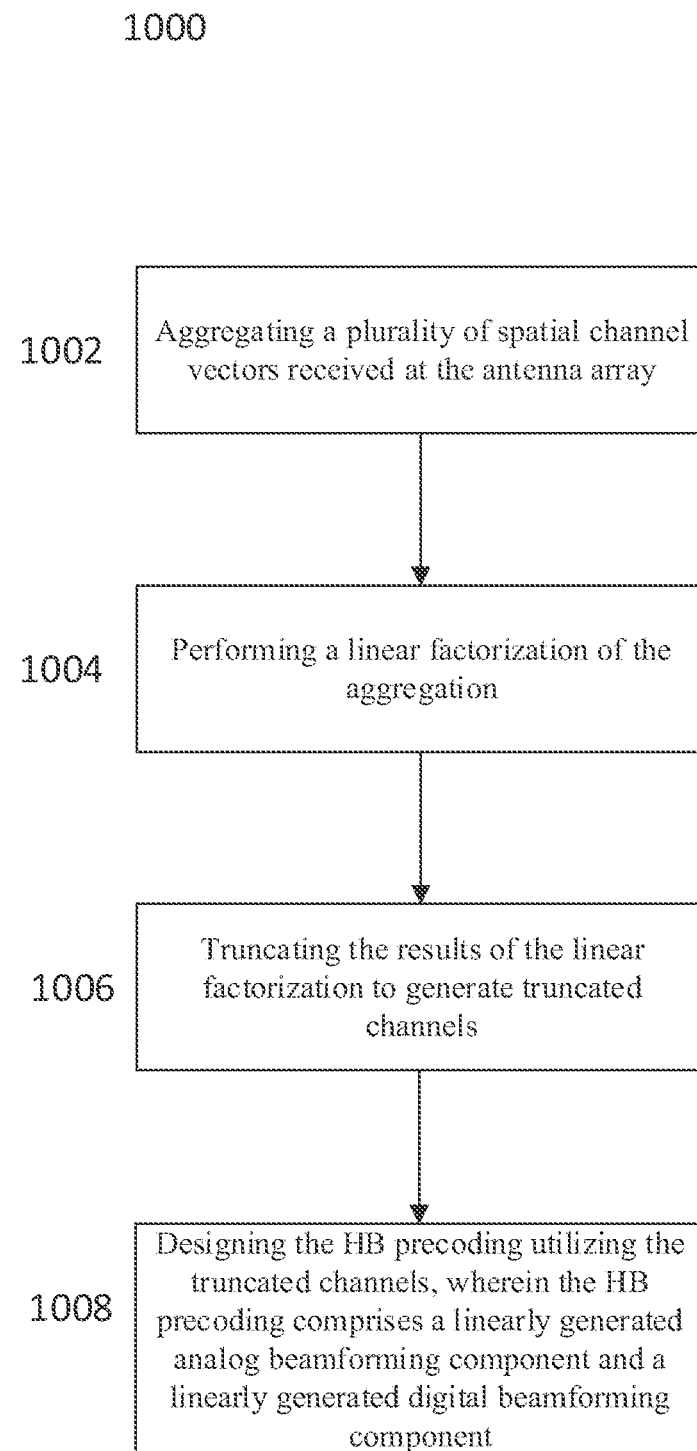
FIG. 10 shows a flowchart for a method to design a hybrid beamforming precoding in an aspect of this disclosure.

FIG. 10 shows a flowchart 1000 in an aspect of this disclosure. It is appreciated that flowchart 1000 is exemplary in nature and may thus be simplified for purposes of this explanation.

First, a plurality of spatial channel vectors received at the antenna array are aggregated 1002. Then, a linear factorization on the results of the aggregation is performed 1004. After this, the results of the linear factorization are truncated to generate truncated channels 1006. Once the truncated channels are generated, the hybrid beamforming (HB) precoding is designed utilizing the truncated channels, wherein the HB includes analog beamforming and a digital beamforming components 1008.

In Example 1, a method adapted for designing a hybrid beamforming (HB) precoding used in a mobile communication system comprising an antenna array, the method including: aggregating spatial channel vectors received by the antenna array; performing a linear factorization of the aggregation; truncating the linear factorization to generate truncated channels; and designing the HB precoding based on the truncated channels, wherein the HB precoding includes a linearly generated analog beamforming component; and a linearly generated digital beamforming component.

In Example 2, the subject matter of Example 1 may include receiving the spatial channel vectors from at least one other device.

In Example 3, the subject matter of Examples 1-2 may include wherein the antenna array comprises at least one antenna port and a plurality of antenna elements.

In Example 4, the subject matter of Examples 1-3 may include wherein aggregating the spatial channel vectors is done over a plurality of subcarriers.

In Example 5, the subject matter of Example 4 may include wherein the plurality of subcarriers comprises scheduled subcarriers for each device.

In Example 6, the subject matter of Examples 1-5 may include wherein the linear factorization comprises a singular value decomposition (SVD).

In Example 7, the subject matter of Examples 1-6 may include wherein the truncating comprises maximizing gains at the apparatus.

In Example 8, the subject matter of Example 7 may include keeping a set of L sub-spatial wideband channel vectors, wherein L equals the number of antenna ports of the apparatus.

In Example 9, the subject matter of Example 8 may include wherein the set comprises the sub-spatial wideband channel vectors with the largest eigenvalues.

In Example 10, the subject matter of Examples 3-9 may include wherein the at least one antenna port comprises a radio frequency (RF) chain.

In Example 11, the subject matter of Example 10 may include wherein each RF chain comprises at least one of an analog to digital converter (ADC), digital to analog converter (DAC) or an amplifier.

In Example 12, the subject matter of Examples 3-11 may include wherein each antenna element is coupled to at least one phase shifter.

In Example 13, the subject matter of Examples 1-6 may include wherein the truncating comprises maximizing a beamforming capacity.

In Example 14, the subject matter of Example 13 may include wherein maximizing the beamforming capacity comprises determining the following:

$$\max_{\sum_{k=1}^{K} |\hat{\Phi}_k| = L} \sum_{f=1}^{C} R_f(\hat{\Phi}_1, \ldots, \hat{\Phi}_K)$$

wherein $R_f = (\hat{\Phi}_1, \ldots, \hat{\Phi}_K)$ is a sum rate of a multiple-user multiple-input multiple-output (MU-MIMO) on a subcarrier f; K is a number of the at least one other device; $\hat{\Phi}_k$ is a set of eigenvalues of a matrix comprising the truncated channels; L is a number of antenna ports of the apparatus; and C is the number of subcarriers.

In Example 15, the subject matter of Examples 1-14 may include calculating a linear precoding vector for each of the at least one other device on each subcarrier from the truncated channels.

In Example 16, the subject matter of Example 15 may include calculating the linear precoding vector for each of the at least one other device on each subcarrier by zero-forcing.

In Example 17, the subject matter of Example 15 may include calculating the linear precoding vector for each of the at least one other device on each subcarrier by minimum mean squared error beamforming.

In Example 18, the subject matter of Examples 15-17 may include aggregating the linear precoding vector for each of the at least one other device over the plurality of subcarriers.

In Example 19, the subject matter of Example 18 may include taking a singular value decomposition (SVD) of the aggregation of the linear precoding vectors.

In Example 20, the subject matter of Example 19 may include constructing an analog beamforming matrix from the SVD of the aggregation of the linear precoding vectors.

In Example 21, the subject matter of Examples 1-20 may include calculating a digital beamforming vector for each other device.

In Example 22, the subject matter of Example 21 may include normalizing the digital beamforming vector for each other device.

In Example 23, the subject matter of Example 22 may include wherein the normalizing is done by multiplying the digital beamforming vector for each other device by a scalar.

In Example 24, a communication device configured to design a hybrid beamforming (HB) precoding, including an antenna array configured to receive spatial channel vectors from one or more devices; aggregation circuitry configured to aggregate the received spatial channel vectors; factorization circuitry configured to perform a linear factorization of the aggregated received spatial channel vectors; truncation circuitry configured to truncate the linear factorization to generate truncated channels; and beamforming generation circuitry configured to generate analog and digital beamforming components from the truncated channels.

In Example 25, the subject matter of Example 24 may include the antenna array comprising at least one antenna port and a plurality of antenna elements.

In Example 26, the subject matter of Example 25 may include the at least one antenna port comprising a radio frequency (RF) chain.

In Example 27, the subject matter of Example 26 may include wherein each RF chain comprises at least one of an analog to digital converter (ADC), digital to analog converter (DAC) or an amplifier.

In Example 28, the subject matter of Examples 25-27 may include wherein each antenna element is coupled to at least one phase shifter.

In Example 29, the subject matter of Examples 24-28 may include the beamforming generation circuitry comprising analog beamforming generation circuitry configured to linearly generate the analog beamforming component from the truncated channels.

In Example 30, the subject matter of Examples 24-29 may include the beamforming generation circuitry comprising digital beamforming generation circuitry configured to linearly generate the digital beamforming component from the truncated channels.

In Example 31, the subject matter of Examples 24-30 may include the factorization circuitry configured to perform the linear factorization by singular value decomposition (SVD).

In Example 32, the subject matter of Examples 24-31 may include the truncation circuitry configured to maximize gains of the communication device.

In Example 33, the subject matter of Example 32 may include the truncation circuitry configured to keep a set of sub-spatial wideband channel vectors with the largest eigenvalues.

In Example 34, the subject matter of Example 33 may include wherein the set comprises of L sub-spatial wideband channel vectors, where L equals the number of antenna ports of the communication device.

In Example 35, the subject matter of Examples 24-31 may include the truncation circuitry configured to maximize a beamforming capacity.

In Example 36, the subject matter of Example 35 may include the truncation circuitry configured to maximize the beamforming capacity according to the following $$\max_{\sum_{k=1}^{K} |\tilde{\Phi}_k|=L} \sum_{f=1}^{C} R_f(\tilde{\Phi}_1, \ldots, \tilde{\Phi}_K)$$

wherein $R_f=(\hat{\Phi}_1, \ldots, \hat{\Phi}_K)$ is a sum rate of a multiple-user multiple-input multiple-output (MU-MIMO) on a subcarrier f; K is a number of the one or more devices; $\hat{\Phi}_k$ is a set of eigenvalues of a matrix comprising the truncated channels; L is a number of antenna ports of the apparatus; and C is the number of subcarriers.

In Example 37, the subject matter of Examples 24-36 may include further comprising calculation circuitry configured to calculate a linear precoding vector for each of the one or more devices on each subcarrier from the truncated channels.

In Example 38, the subject matter of Example 37 may include the calculation circuitry further configured to calculate the linear precoding vector for each of the one or more devices on each subcarrier from the truncated channels by zero-forcing.

In Example 39, the subject matter of Example 37 may include the calculation circuitry further configured to calculate the linear precoding vector for each of the one or more devices on each subcarrier from the truncated channels by minimum mean squared error beamforming.

In Example 40, the subject matter of Examples 37-39 may include the calculation circuitry further configured to aggregate the linear precoding vector for each of the one or more devices over the plurality of subcarriers.

In Example 41, the subject matter of Example 40 may include the calculation circuitry further configured to determine a singular value decomposition (SVD) of the aggregation of the linear precoding vectors.

In Example 42, the subject matter of Example 41 may include the beamforming generation circuitry configured to construct an analog beamforming matrix from the SVD of the aggregation of the linear precoding vectors.

In Example 43, the subject matter of Examples 24-42 may include the beamforming generation circuitry configured to construct a digital beamforming vector for each of the one or more devices.

In Example 44, the subject matter of Example 43 may include the beamforming generation circuitry configured to further normalize the digital beamforming vector for each of the one or more devices.

In Example 45, the subject matter of Example 44 may include the beamforming generation circuitry configured to normalize the digital beamforming vector for each of the one or more devices by multiplying the vector by a scalar.

In Example 46, a circuit arrangement adapted to design a hybrid beamforming (HB) precoding including circuitry configured to: aggregate spatial channel vectors; perform a linear factorization of the aggregated spatial channel vectors; truncate the linear factorization to generate truncated channels; generate an analog beamforming component from the truncated channels; and generate a digital beamforming component from the truncated channels.

In Example 47, the subject matter of Example 46 may include circuitry configured to receive the spatial channel vectors from one or more devices.

In Example 48, the subject matter of Example 47 may include the circuitry configured to receive comprising at least one antenna port and at plurality of antenna elements.

In Example 49, the subject matter of Example 48 may include the at least one antenna port comprising a radio frequency (RF) chain.

In Example 50, the subject matter of Example 49 may include wherein each RF chain comprises at least one of an analog to digital converter (ADC), digital to analog converter (DAC) or an amplifier.

In Example 51, the subject matter of Examples 48-50 may include wherein each antenna element is coupled to at least one phase shifter.

In Example 52, the subject matter of Examples 47-51 may include the circuitry configured to generate an analog beamforming component further configured to linearly generate the analog beamforming component from the truncated channels.

In Example 53, the subject matter of Examples 47-52 may include the circuitry configured to generate a digital beamforming component further configured to linearly generate the digital beamforming component from the truncated channels.

In Example 54, the subject matter of Examples 47-53 may include the circuitry configured to perform the linear factorization further configured to perform the linear factorization by singular value decomposition (SVD).

In Example 55, the subject matter of Examples 47-54 may include the circuitry configured to truncate further configured to maximize gains of the communication device.

In Example 56, the subject matter of Example 55 the circuitry configured to truncate further configured to keep a set of sub-spatial wideband channel vectors with the largest eigenvalues.

In Example 57, the subject matter of Example 56 may include wherein the set comprises of L sub-spatial wideband channel vectors, where L equals the number of antenna ports of the communication device.

In Example 58, the subject matter of Examples 47-54 may include the circuitry configured to truncate further configured to maximize a beamforming capacity.

In Example 59, the subject matter of Example 58 may include the circuitry configured to truncate further configured to maximize the beamforming capacity according to the following $$\max_{\sum_{k=1}^{K} |\hat{\Phi}_k| = L} \sum_{f=1}^{C} R_f(\hat{\Phi}_1, \ldots, \hat{\Phi}_K)$$

wherein $R_f(\hat{\Phi}_1, \ldots, \hat{\Phi}_K)$ is a sum rate of a multiple-user multiple-input multiple-output (MU-MIMO) on a subcarrier f; K is a number of the one or more devices; $\hat{\Phi}_k$ is a set of eigenvalues of a matrix comprising the truncated channels; L is a number of antenna ports of the apparatus; and C is the number of subcarriers.

In Example 60, the subject matter of Examples 47-59 may include circuitry configured to calculate a linear precoding vector for each of the one or more devices on each subcarrier from the truncated channels.

In Example 61, the subject matter of Example 60 may include circuitry configured to calculate the linear precoding vector for each of the one or more devices on each subcarrier from the truncated channels by zero-forcing.

In Example 62, the subject matter of Example 60 may include configured to calculate the linear precoding vector for each of the one or more devices on each subcarrier from the truncated channels by minimum mean squared error beamforming.

In Example 63, the subject matter of Examples 60-62 may include circuitry configured to aggregate the linear precoding vector for each of the one or more devices over the plurality of subcarriers.

In Example 64, the subject matter of Example 63 may include circuitry configured to determine a singular value decomposition (SVD) of the aggregation of the linear precoding vectors.

In Example 65, the subject matter of Examples 46-64 may include circuitry configured to construct an analog beamforming matrix from the SVD of the aggregation of the linear precoding vectors.

In Example 66, the subject matter of Examples 46-65 may include circuitry configured to calculate a digital beamforming vector for each other device.

In Example 67, the subject matter of Example 66 may include circuitry configured to further normalize the digital beamforming vector for each other device.

In Example 68, the subject matter of Example 67 may include circuitry configured to normalize the digital beamforming vector for each other device by multiplying the vector by a scalar.

In Example 69, a non-transitory computer readable medium with program instructions, which when executed, cause a processor of a device with an antenna array to design a hybrid beamforming (HB) precoding, including aggregating spatial channel vectors received by the antenna array, performing a linear factorization of the aggregation; truncating the linear factorization to generate truncated channels; and designing the HB precoding utilizing the truncated channels, wherein the HB precoding include a linearly generated analog beamforming component; and a linearly generated digital beamforming component.

In Example 70, the subject matter of Example 69 may include receiving the spatial channel vectors from one or more devices.

In Example 71, the subject matter of Examples 69-70 may include wherein the antenna array comprises at least one antenna port and a plurality of antenna elements.

In Example 72, the subject matter of Examples 69-71 may include wherein aggregating the spatial channel vectors is done over a plurality of subcarriers.

In Example 73, the subject matter of Example 72 may include wherein the plurality of subcarriers comprises scheduled subcarriers for each device.

In Example 74, the subject matter of Examples 69-73 may include wherein the linear factorization comprises a singular value decomposition (SVD).

In Example 75, the subject matter of Examples 69-74 may include wherein the truncating comprises maximizing gains at the apparatus.

In Example 76, the subject matter of Example 75 may include keeping a set of L sub-spatial wideband channel vectors, wherein L equals the number of antenna ports of the apparatus.

In Example 77, the subject matter of Example 76 may include wherein the set comprises the sub-spatial wideband channel vectors with the largest eigenvalues.

In Example 78, the subject matter of Examples 71-77 may include wherein the at least one antenna port comprises a radio frequency (RF) chain.

In Example 79, the subject matter of Example 78 may include wherein each RF chain comprises at least one of an analog to digital converter (ADC), digital to analog converter (DAC) or an amplifier.

In Example 80, the subject matter of Examples 71-79 may include wherein each antenna element is coupled to at least one phase shifter.

In Example 81, the subject matter of Examples 69-74 may include wherein the truncating comprises maximizing a beamforming capacity.

In Example 82, the subject matter of Example 81 may include wherein maximizing the beamforming capacity comprises determining the following:

$$\max_{\sum_{k=1}^{K} |\hat{\Phi}_k| = L} \sum_{f=1}^{C} R_f(\hat{\Phi}_1, \ldots, \hat{\Phi}_K)$$

wherein $R_f(\hat{\Phi}_1, \ldots, \hat{\Phi}_K)$ is a sum rate of a multiple-user multiple-input multiple-output (MU-MIMO) on a subcarrier f; K is a number of the one or more devices; $\hat{\Phi}_k$ is a set of eigenvalues of a matrix comprising the truncated channels; L is a number of antenna ports of the apparatus; and C is the number of subcarriers.

In Example 83, the subject matter of Examples 69-82 may include calculating a linear precoding vector for each of the one or more devices on each subcarrier from the truncated channels.

In Example 84, the subject matter of Example 83 may include calculating the linear precoding vector for each of the one or more devices on each subcarrier by zero-forcing.

In Example 85, the subject matter of Example 84 may include calculating the linear precoding vector for each of the one or more devices on each subcarrier by minimum mean squared error beamforming.

In Example 86, the subject matter of Examples 83-85 may include aggregating the linear precoding vector for each of the one or more devices over the plurality of subcarriers.

In Example 87, the subject matter of Example 86 may include taking a singular value decomposition (SVD) of the aggregation of the linear precoding vectors.

In Example 88, the subject matter of Example 87 may include constructing an analog beamforming matrix from the SVD of the aggregation of the linear precoding vectors.

In Example 89, the subject matter of Examples 69-88 may include calculating a digital beamforming vector for each other device.

In Example 90, the subject matter of Example 89 may include normalizing the digital beamforming vector for each other device.

In Example 91, the subject matter of Example 90 may include wherein the normalizing is done by multiplying the digital beamforming vector for each other device by a scalar.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement for a communication device adapted to design a hybrid beamforming (BB) precoding comprising circuitry configured to:
    aggregate spatial channel vectors;
    perform a linear factorization of the aggregated spatial channel vectors;
    truncate the linear factorization to generate truncated channels;
    generate an analog beamforming component from the truncated channels; and
    generate a digital beamforming component from the truncated channels.

2. The circuit arrangement of claim 1, further comprising circuitry configured to receive the spatial channel vectors from one or more devices.

3. The circuit arrangement of claim 1, the circuitry configured to generate an analog beamforming component further configured to linearly generate the analog beamforming component from the truncated channels.

4. The circuit arrangement of claim 1, the circuitry configured to generate a digital beamforming component further configured to linearly generate the digital beamforming component from the truncated channels.

5. The circuit arrangement of claim 1, the circuitry configured to perform the linear factorization further configured to perform the linear factorization by singular value decomposition (SVD).

6. The circuit arrangement of claim 1, the circuitry configured to truncate further configured to maximize gains of the communication device.

7. The circuit arrangement of claim 1, the circuitry configured to truncate further configured to maximize a beamforming capacity.

8. The circuit arrangement of claim 1, further comprising circuitry configured to calculate a linear precoding vector for each of the one or more devices on each subcarrier from the truncated channels.

9. The circuit arrangement of claim 8, further comprising circuitry configured to calculate the linear precoding vector for each of the one or more devices on each subcarrier from the truncated channels by zero-forcing.

10. The circuit arrangement of claim 8, further comprising circuitry configured to calculate the linear precoding vector for each of the one or more devices on each subcarrier from the truncated channels by minimum mean squared error beamforming.

11. The circuit arrangement of claim 8, further comprising circuitry configured to aggregate the linear precoding vector for each of the one or more devices over the plurality of subcarriers.

12. The circuit arrangement of claim 11, further comprising circuitry configured to determine a singular value decomposition (SVD) of the aggregation of the linear precoding vectors.

13. The circuit arrangement of claim 12, further comprising circuitry configured to construct an analog beamforming matrix from the SVD of the aggregation of the linear precoding vectors.

14. The circuit arrangement of claim 1, further comprising circuitry configured to calculate a digital beamforming vector for each of the one or more devices.

15. A communication device configured to design a hybrid beamforming (BB) precoding, comprising:
    an antenna array configured to receive spatial channel vectors from one or more devices;
    aggregation circuitry configured to aggregate the received spatial channel vectors;
    factorization circuitry configured to perform a linear factorization of the aggregated received spatial channel vectors;
    truncation circuitry configured to truncate the linear factorization to generate truncated channels; and
    beamforming generation circuitry configured to generate analog and digital beamforming components from the truncated channels.

16. The communication device of claim 15, the beamforming generation circuitry comprising analog beamforming generation circuitry configured to linearly generate the analog beamforming component from the truncated channels.

17. The communication device of claim 15, the beamforming generation circuitry comprising digital beamforming generation circuitry configured to linearly generate the digital beamforming component from the truncated channels.

18. The communication device of claim 15, the factorization circuitry configured to perform the linear factorization by singular value decomposition (SVD).

19. The communication device of claim 15, further comprising calculation circuitry configured to calculate a linear precoding vector for each of the one or more devices on each subcarrier from the truncated channels.

20. A method adapted for designing a hybrid beamforming (HB) precoding used in a mobile communication system comprising an antenna array, the method comprising:
    aggregating spatial channel vectors received by the antenna array;
    performing a linear factorization of the aggregation;
    truncating the linear factorization to generate truncated channels; and
    designing the HB precoding based on the truncated channels, wherein the HB precoding comprises:
        a linearly generated analog beamforming component; and
        a linearly generated digital beamforming component.

21. The method of claim 20, wherein the linear factorization comprises a singular value decomposition (SVD).

22. The method of claim 20, wherein the truncating comprises maximizing a beamforming capacity.

23. The method of claim 20, further comprising calculating a linear precoding vector for each of the one or more devices on each subcarrier from the truncated channels.

24. A non-transitory computer readable medium with program instructions, which when executed, cause a processor of a device with an antenna array to design a hybrid beamforming (BB) precoding, comprising:
    aggregating spatial channel vectors received by the antenna array;
    performing a linear factorization of the aggregation;
    truncating the linear factorization to generate truncated channels; and
    designing the HB precoding utilizing the truncated channels, wherein the HB precoding comprises:
        a linearly generated analog beamforming component; and
        a linearly generated digital beamforming component.

25. The non-transitory computer readable medium of claim 24, wherein the linear factorization comprises a singular value decomposition (SVD).

* * * * *